(12) United States Patent
Shaffer et al.

(10) Patent No.: US 8,249,596 B2
(45) Date of Patent: Aug. 21, 2012

(54) LOCATION BASED HANDOFF

(75) Inventors: Shmuel Shaffer, Palo Alto, CA (US);
Ramanathan T. Jagadeesan, San Jose, CA (US); Bich Tu Nguyen, Los Altos, CA (US); Gregory D. Pelton, Raleigh, NC (US); Labhesh Patel, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 12/030,050

(22) Filed: Feb. 12, 2008

(65) Prior Publication Data
US 2009/0203394 A1    Aug. 13, 2009

(51) Int. Cl.
*H04W 36/00*   (2009.01)
(52) U.S. Cl. .......................................... 455/436; 455/440
(58) Field of Classification Search ............... 455/404.2, 455/432.1, 436, 440, 442, 456.1
See application file for complete search history.

(56) References Cited

U.S. PATENT DOCUMENTS

| | | | |
|---|---|---|---|
| 5,999,816 A * | 12/1999 | Tiedemann et al. | 455/437 |
| 6,125,278 A * | 9/2000 | Wieczorek et al. | 455/437 |
| 6,385,454 B1 * | 5/2002 | Bahl et al. | 455/450 |
| 6,654,362 B1 | 11/2003 | Palamara | 370/332 |
| 7,197,310 B2 | 3/2007 | Gehlot et al. | 455/440 |
| 7,289,810 B2 | 10/2007 | Jagadeesan et al. | 455/439 |
| 7,328,018 B2 | 2/2008 | Lee et al. | 455/436 |
| 7,330,728 B1 | 2/2008 | Moll et al. | 455/456 |
| 7,912,479 B2 * | 3/2011 | Tanaka et al. | 455/453 |
| 2002/0049058 A1 * | 4/2002 | Tee | 455/437 |
| 2005/0143090 A1 * | 6/2005 | Dowling | 455/456.1 |

* cited by examiner

Primary Examiner — Nick Corsaro
Assistant Examiner — Joel Ajayi
(74) Attorney, Agent, or Firm — Baker Botts L.L.P.

(57) ABSTRACT

A method includes determining a coverage area for each of a plurality of base stations. The method also includes receiving a first location parameter indicative of a mobile unit's location. The method further includes transitioning a first connection between the mobile unit and a first base station of the plurality of base stations to a second connection between the mobile unit and a second base station of the plurality of base stations. The transition is based on the coverage areas of the first base station and the second base station and the first location parameter.

27 Claims, 2 Drawing Sheets

LOCATION BASED HANDOFF

TECHNICAL FIELD OF THIS DISCLOSURE

The present disclosure relates generally to location based handoff.

BACKGROUND

There exist devices and programs that provide users with directions between known locations. For example, the user may use one of these devices to get directions from her office to a friend's house that she has not previously visited. These devices may be used with a positioning system such as a Global Positioning System (GPS) to allow the device to determine the user's location.

A cellular network is traditionally divided into several individual cells. A user accessing the cellular network may do so through one cell at a time. More specifically, the user may be connected to only one cell at a time. As the user moves from a first cell to a second cell his signal may start to become weaker within the first cell as it becomes stronger within the second cell. At some point the signal strength will be such that the user will be handed-off from the first cell to the second cell. A similar technique may be used in a wireless network as a user, with for example a laptop, moves between networks.

BRIEF DESCRIPTION OF THE DRAWINGS

To provide a more complete understanding of the features and advantages of particular embodiments, reference is made to the following description, taken in conjunction with the accompanying drawings, in which.

DESCRIPTION OF EXAMPLE EMBODIMENTS

Overview

In accordance with particular embodiments, a method includes determining a coverage area for each of a plurality of base stations. The method also includes receiving a first location parameter indicative of a mobile unit's predicted location. The method further includes transitioning a first connection between the mobile unit and a first base station of the plurality of base stations to a second connection between the mobile unit and a second base station of the plurality of base stations. The transition is based on the coverage areas of the first base station and the second base station and the first location parameter.

Description

Figure 1:
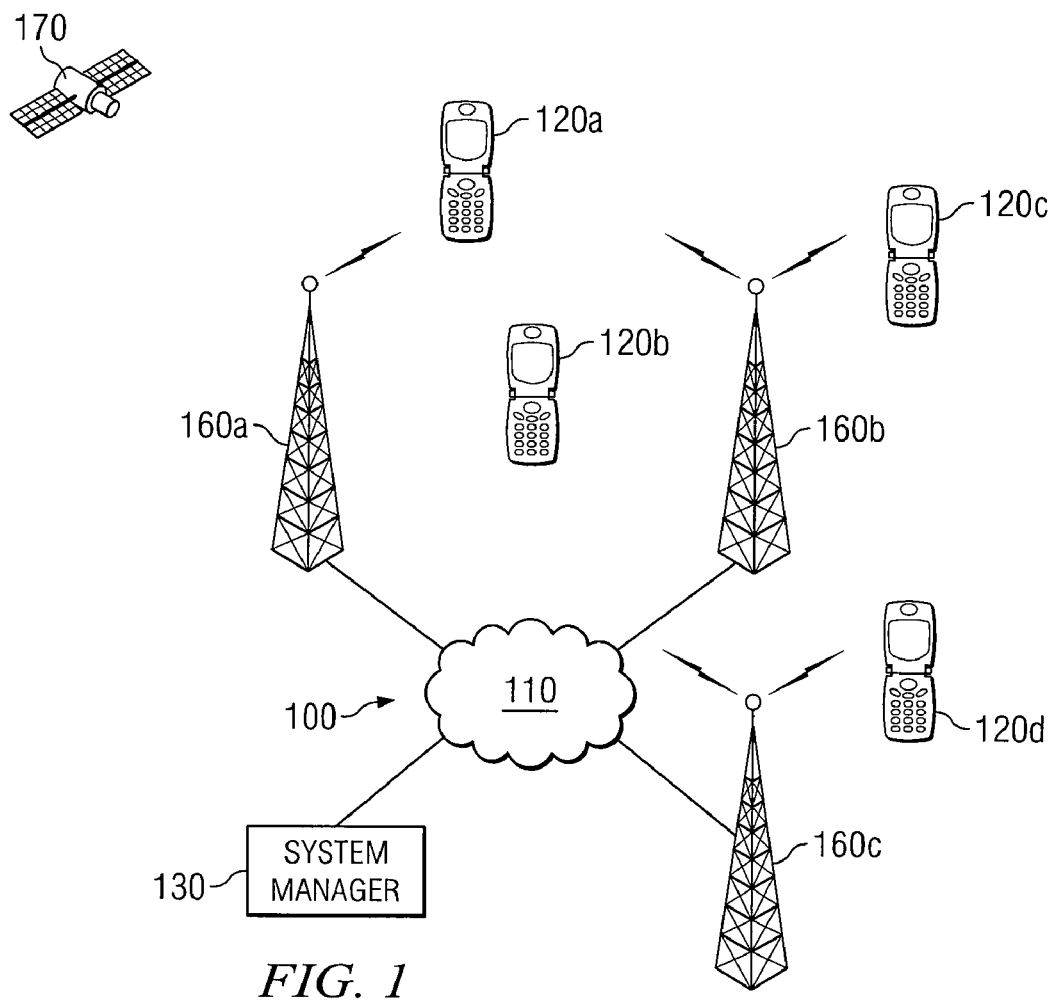
FIG. 1 is a block diagram illustrating a communication network comprising a plurality of components that may be used to facilitate location based handoffs, in accordance with a particular embodiment.

FIG. 1 is a block diagram illustrating a communication network comprising a plurality of components that may be used to facilitate location based handoffs, in accordance with a particular embodiment. Communication network 100 comprises network 110, mobile units 120, system manager 130, base stations 160 and satellite 170. These components may provide mobile units 120 with wireless access to network 110 based on the location of mobile units 120. Network access may be provided through wireless connections that may be maintained as mobile units 120 travel from the coverage area of one base station 160 to the next. As mobile units 120 travel between coverage areas of base stations 160 they may be handed-off based on their current and/or predicted location, as opposed to their signal strength. For example, satellite 170 may provide mobile unit 120*b* with information that may be used by mobile unit 120*b* to determine its location parameter. For example, this may be done using global positioning system (GPS) information). The location parameter may include information that expressly or implicitly provides system manager 130 with mobile unit 120*b*'s predicted location. The predicted location may be based on a mobile unit's current location as well as other factors that may indicate the mobile units direction of travel (e.g., heading, rate of travel, destination, etc.). In particular embodiments, mobile unit 120*b* may be able to determine its predicted location and send that information as a location parameter to system manager 130. In some embodiments, mobile unit 120*b* may provide system manager 130 with its current location which system manager 130 may use to determine mobile unit 120*b*'s predicted location. Based on this location parameter provided by mobile unit 120*b* and the coverage areas of base stations 160*a* and 160*b*, system manager 130 may determine when to handoff mobile unit 120*b* from base station 160*a* to base station 160*b*. In certain scenarios, system manager 130 may be able to reserve resources or anticipate a handoff based on a future predicted location of mobile unit 120*b*. The predicted location may be based on a variety of factors such as mobile unit 120*b*'s speed and traveling direction or mobile unit 120*b*'s destination and/or route. This may allow for improved planning and resource management among base stations 160.

Network 110 may comprise a collection of network components, such as routers, servers, nodes, gateways, gatekeepers, hubs, switches, session border controllers, and/or any other additional hardware, software, or embedded logic implementing any number of communication protocols that may allow for the exchange of packets between network components and components connected to network 110. Network 110 may allow data and signaling to be passed between the various components depicted in FIG. 1. Accordingly, system manager 130 may be able to participate in and/or coordinate the handoffs of mobile units 120 between base stations 160. In some embodiments, network 110 may include, or provide access to numerous other networks. Accordingly, in particular embodiments mobile units 120 may be able to wirelessly access, for example, the internet via one of base stations 160 and its respective connection to network 110.

Network 110 may be any network capable of transmitting audio and/or video communication signals, data, and/or messages, including signals, data or messages transmitted through phone calls, text chat, instant messaging and e-mail (generally referred to as packets herein). All, some, or none of network 110 may be implemented as a local area network (LAN), wide area network (WAN), globally distributed network (e.g., the Internet), Intranet, Extranet, public switched telephone network (PSTN), cellular network, mesh network, or any other form of wireless or wireline communication network. Generally, network 110 provides for the communication of packets, cells, frames, or other portions of information (generally referred to as packets herein) between the components that make up, and are connected to, network 110. In some embodiments, network 110 may comprise an internet protocol (IP) network. IP networks transmit data by placing the data in packets and sending each packet individually to the selected destination, along one or more communication paths. In particular embodiments, network 110 may employ media communication protocols that allow for the addressing or identification of endpoints, nodes, and/or other network components coupled to network 110. For example, using IP, each of the components coupled together by network 110 may be identified in information directed using IP addresses. In this manner, network 110 may support any form and/or combination of point-to-point, multicast, unicast, or other techniques for exchanging media packets among components. Any network components capable of exchanging audio, video, or other data using frames or packets may be included in different embodiments.

Network 110 may be coupled to other networks, such as other IP networks, (e.g., the Internet). Since IP networks share a common method of transmitting data, signals and/or data may be transmitted between components located on different, but interconnected, IP networks. For example, in some embodiments, each base station 160 may represent a different radio network using IP. Accordingly, as mobile units 120 move between radio networks they may not notice the actual transition or handoff from one radio network to the next. In addition to being coupled to other IP networks, network 110 may also be coupled to or include non-IP networks through the use of interfaces and/or gateways. For example, network 110 may be coupled to a PSTN. A PSTN may include switching stations, central offices, mobile telephone switching offices, pager switching offices, remote terminals, and other related telecommunications equipment located throughout the world. Unlike an IP network, a PSTN may rely on a dedicated circuit between two endpoints of a communication session.

In particular embodiments, one or more of the networks within, or coupled to, network 110 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

Mobile units 120 may comprise any suitable combination of hardware, software and/or encoded logic operable to send and receive data and/or signals from base stations 160. As may be apparent, mobile units 120 may include a wide variety of technologies, capabilities and products that may be operable to communicate wirelessly. For example, mobile unit 120a may be a laptop with wireless fidelity (WiFi) capabilities. As another example, mobile unit 120b may be a mobile phone using cellular technology. In particular embodiments, mobile units 120 may be able to determine their location. For example, mobile unit 120c may include global positioning system (GPS) capabilities. As another example, mobile unit 120d may be able to determine its location using a wireless-networking location feature. In some embodiments, mobile units 120 may not only provide their location but also their destination. This may allow system manager 130 to reserve resources (e.g., a channel and/or bandwidth) along the path/route of mobile unit 120. Mobile units 120 may, in some embodiments, also be able to make handoff decisions on their own based on their location and the location of any nearby or adjacent base stations 160.

System manager 130 may comprise any suitable combination of hardware, software and/or encoded logic operable to manage, assign, schedule, release, reserve, or otherwise manipulate wireless connections for communication network 100. In particular embodiments, system manager 130 may store the location of base stations 160 and/or the area serviced by base stations 160. This may allow system manager 130 to determine to which base station a particular mobile unit 120 should be connected and when that particular mobile unit 120 should be handed-off to a different base station 160. For example, upon receiving information indicative of the location or of a predicted location of mobile unit 160d, system manager 130 may determine that mobile unit 160d is closest to base station 160c. Based on this determination system manager 130 may determine that a wireless connection should be established between base station 160c and mobile unit 120d. As mobile unit 120d approaches base station 160d, at some point system manager 130 may decide to hand off mobile unit 120d to base station 160d.

In some embodiments, system manager 130 may also receive information related to mobile unit 120d's destination (e.g., from a guidance unit). Based on this information, along with information indicative of mobile unit 120d's location, system manager 130 may be able to predict which base station 160 will be the next base station 160 to which mobile unit 120d should be connected. In some embodiments, the accuracy of the timing of the predicted handoff may be increased by taking into account the speed of mobile unit 120d.

System manager 130 may employ other techniques to predict the destination (or intermediary destination) of mobile units 120. For example, if mobile unit 120c is traveling along a highway, system manager 130 may determine that mobile unit 120c may continue along the same highway and thus will soon be leaving the area serviced by base station 160b and entering the area serviced by base station 160a. Accordingly, prior to mobile unit 120c entering the area serviced by base station 160a, system manager 130 may reserve the necessary resources with base station 160a and make any preparations that may be needed to facilitate the handoff from base station 160b to base station 160a. Similarly, system manager 130 may predict the next base station 160 based on the direction of travel of mobile unit 120c. In particular embodiments, the handoff of mobile unit 120a to another base station 160 may be accelerated in order to free up resources for an approaching mobile unit (e.g., mobile unit 120c).

While system manager 130 is depicted as a separate component, in other embodiments, the functionality and features of system manager 130 may be incorporated in one or more of base stations 160 and/or mobile units 120. In accordance with some embodiments, the functionality of system manager 130 may be distributed in and provided by network 110. For example, network 110 may be architected as an Application Oriented Network (AON).

Base stations 160 may comprise any suitable combination of hardware, software and/or encoded logic operable to transmit/receive information wirelessly. Depending on the embodiment base stations 160 may provide any of a wide variety of wireless services. For example, in some embodiments, base stations 160 may comprise cellular towers for use in a cellular wireless network. As another example, in some embodiments, base stations 160 may represent radio towers for use in a radio network. As yet another example, in particular embodiments, base stations 160 may comprise WiMax base stations. Regardless of the type of wireless technology used, base station 160 may represent different transmission technologies or networks, each of which may have a separate wired or wireless connection to network 110. The connection may be direct, as depicted in FIG. 1, or indirect, such as when a base station connects to network 110 through an intermediary component (e.g., another base station or mobile unit). Thus, mobile units 120 may be able to access network 110 via a wireless connection through a particular base station.

Satellite 170 may comprise any suitable combination of hardware, software and/or encoded logic operable to provide mobile units 120 with information that mobile units 120 may use in determining their location. For example, satellite 170 may transmit information that may be used by GPS receivers to determine the location of, for example, mobile unit 120*a*.

Although FIG. 1 illustrates a particular number and configuration of components, different embodiments may use any number or arrangement of such components for providing location based handoffs. In addition, these components may include sub-components that may be centrally located (local) with respect to one another or distributed throughout communication network 100. Similarly, the features and functionality of two more components may be combined or redistributed into more, fewer or the same number of components.

Figure 2:
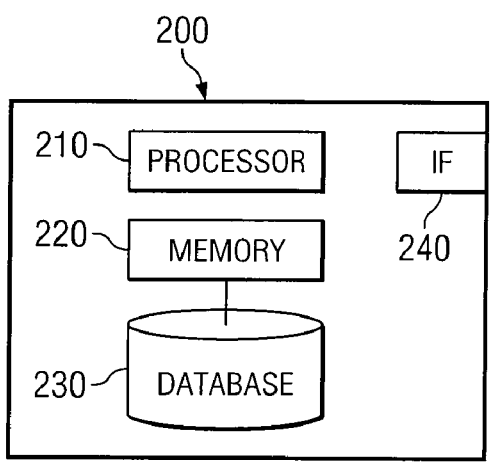
FIG. 2 is a block diagram illustrating some of the components of a system manager, in accordance with a particular embodiment.

FIG. 2 is a block diagram illustrating some of the components of a system manager, in accordance with a particular embodiment. System manager 200 may be similar to, and provide similar functionality as, system manager 130 depicted in FIG. 1. Different embodiments may include all, some, or none of the components depicted in FIG. 2. Additionally, some embodiments may include different and/or additional components. Furthermore, as mentioned above, system manager 200 may be a separate stand alone device or it may be incorporated into or be a part of one or more different devices (e.g., base station 160, network 110, or mobile unit 120 depicted in FIG. 1). As depicted, system manager 200 includes processor 210, memory 220, database 230, and interface 240.

Processor 210 may be a microprocessor, controller, or any other suitable computing device, resource, or combination of hardware, software and/or encoded logic operable to provide, either alone or in conjunction with other system manager 200 components (e.g., memory 220), system manager functionality. Such functionality may include providing various features discussed herein to a user. One feature that certain embodiments may provide may include facilitating and/or participating in the providing of location based handoff. More specifically, processor 210 may be able to compare the location, or predicted location, of a mobile unit with the locations of various nearby base stations to determine when and to which base station to handoff the mobile unit. Not only may processor 210 take into account the current location of the mobile unit, it may also take into account the direction and speed of travel of the mobile unit, the mobile unit's intended destination and/or the route of the mobile unit. Processor 210 may use this information to anticipate or predict the next base station to which the mobile unit may be handed-off. In particular embodiments, system manager 200 may alert a base station regarding the approaching mobile endpoint. The alert may include the estimated arrival time.

Memory 220 may be any form of volatile or non-volatile memory including, without limitation, magnetic media, optical media, random access memory (RAM), read-only memory (ROM), removable media, or any other suitable local or remote memory component. Memory 220 may store any suitable data or information, including software and encoded logic, utilized by route planner 200. For example, memory 220 may maintain a listing, table, or other organization of information used in determining the location of the mobile unit. Memory 220 may also store information related to different routes between various destinations to aid in predicting and/or alerting the next base station. As another example, memory 220 may store user profiles which may include various addresses entered by a user, such as their home address or their work address, or certain routes they often use. In some embodiments, memory 220 may store one or more policies that may be used in determining when and how a mobile unit is to be handed-off. These policies may, for example, be used to distinguish priority between different types of mobile units or the users of the mobile units. The policies may also allow different optimization parameters to be applied. The optimization parameters may be designed to improve network or base station efficiency (e.g., maintain a predetermined load level) or reduce the impact on the user experience (e.g., making sure that a user has a minimum amount of bandwidth). The policies may further include provisions for handling congestion within the service area of a particular base station. For example, if a particular base station is at or near its capacity, the policies may provide guidance on which mobile units should be moved to adjacent base stations and when the handoffs should be made. Using this information a handoff between base stations may be delayed or accelerated to ensure that each base station has at any given time proper resources to handle the demand.

Database 230 may represent or use any appropriate combination of hardware, software and/or encoded logic either within system manager 200 or distributed throughout a network (e.g., communication network 100 in FIG. 1). For example, database 230 may be any form of volatile or non-volatile memory including, without limitation, magnetic media, optical media, RAM, ROM, removable media, or any other suitable local or remote memory component. Database 230 may store any suitable data or information utilized by route planner 200. For example, database 230 may maintain a listing, table, or other organization of information about the location of various base stations and their respective coverage areas. This information may be used by processor 210 in combination with, for example, a mobile unit's predicted location to determine or predict the next handoff. Database 230 may be accessed, either directly or indirectly, by a user updating the contents of database 230 or by processor 210 to determine handoffs. In particular embodiments, database 230 may reside within or be maintained, in part or entirely, by memory 220.

Interface 240 may comprise any hardware, software, and/or encoded logic needed to be able to send and receive information to/from other components, such as base stations. For example, interface 240 may receive messages indicating the location of a particular mobile unit. Upon processor 210 determining the next handoff for the mobile unit, interface 240 may transmit a message to the appropriate base stations alerting them of the upcoming handoff.

Figure 3:
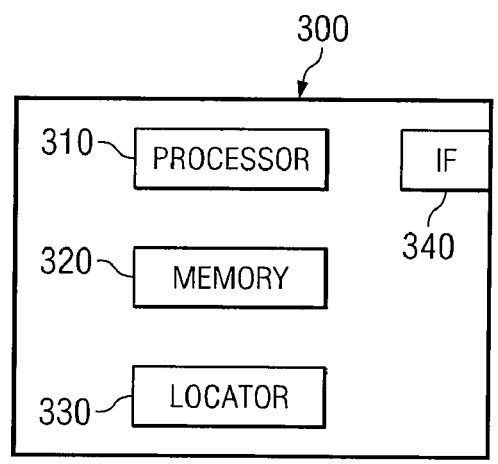
FIG. 3 is a block diagram illustrating some of the components of a mobile unit, in accordance with a particular embodiment.

FIG. 3 is a block diagram illustrating some of the components of a mobile unit, in accordance with a particular embodiment. Mobile unit 300 may be similar to, and provide similar functionality as any of mobile units 120 depicted in FIG. 1. Different embodiments may include all, some, or none of the components depicted in FIG. 3. Different embodiments may also include different and/or additional components. As depicted, mobile unit 300 includes processor 310, memory 320, locator 330 and interface 340.

Processor 310 may be a microprocessor, controller, or any other suitable computing device, resource, or combination of hardware, software and/or encoded logic operable to provide, either alone or in conjunction with other mobile unit 300 components (e.g., memory 320) mobile unit functionality. Such functionality may include providing various features discussed herein to a user. One feature that certain embodiments may provide includes determining the predicted location of mobile unit 300. For example, using information provided by locator 330, processor 310 may be able to determine the geographic location of mobile unit 300. In particular embodiments processor 310 may also be able to determine a destination of mobile unit 300. For example, mobile unit 300 may be (or include) a device providing routing guidance to a user wherein the processor determines the quickest/shortest route between two locations.

Memory 320 may be any form of volatile or non-volatile memory including, without limitation, magnetic media, optical media, random access memory (RAM), read-only memory (ROM), removable media, or any other suitable local or remote memory component. Memory 320 may store any suitable data or information, including software and encoded logic, utilized by mobile unit 300. For example, memory 320 may maintain a listing, table, or other organization of information related to locations, destinations, routes and/or roads used in determining routes between two locations. More specifically, memory 320 may store user profiles which may include various addresses entered by a user, such as their home address or their work address; memory 320 may store a list of roads the user often uses (e.g., roads he uses to travel between work and home); or memory 320 may store information that it may use to determine a route between two addresses. In some embodiments, memory 320 may store one or more policies that may be used in determining when mobile unit 300 should be handed-off from one base station to the next. These policies may be used by processor 310 in combination with information from locator 330 to determine, based on the location or predicted location of the mobile unit, to which base station mobile unit should be connected and when/where it should be handed-off. For example, the policies may be designed to optimize the user's experience or reduce the user's costs. Memory 320 may also store information indicative of the location of various base stations and/or the area they service.

Locator 330 may represent or use any appropriate combination of hardware, software and/or encoded logic to determine the location of mobile unit 300. For example, in some embodiments locator 330 may use GPS information to determine the location of mobile unit 300. In particular embodiments, locator 330 may use wireless-networking location information to determine the location of mobile unit 300.

Interface 340 may comprise any hardware, software, and/or encoded logic needed to be able to send and receive information between other components, such as base stations or satellites, and with a user. Depending on the embodiment, interface 340 may include any of a variety of different types of interfaces. For example, interface 340 may include a radio or cellular transmitter/receiver for receiving data and/or location information from base stations. In another example, interface 340 may include a GPS antenna for receiving GPS information from a satellite. Interface 340 may also include a microphone, speaker, and keypad for providing a user with both visual and audible information and receiving user input. As may be apparent, interface 340 may comprise several separate components to provide the interaction and communication needs of a mobile unit.

Figure 4:
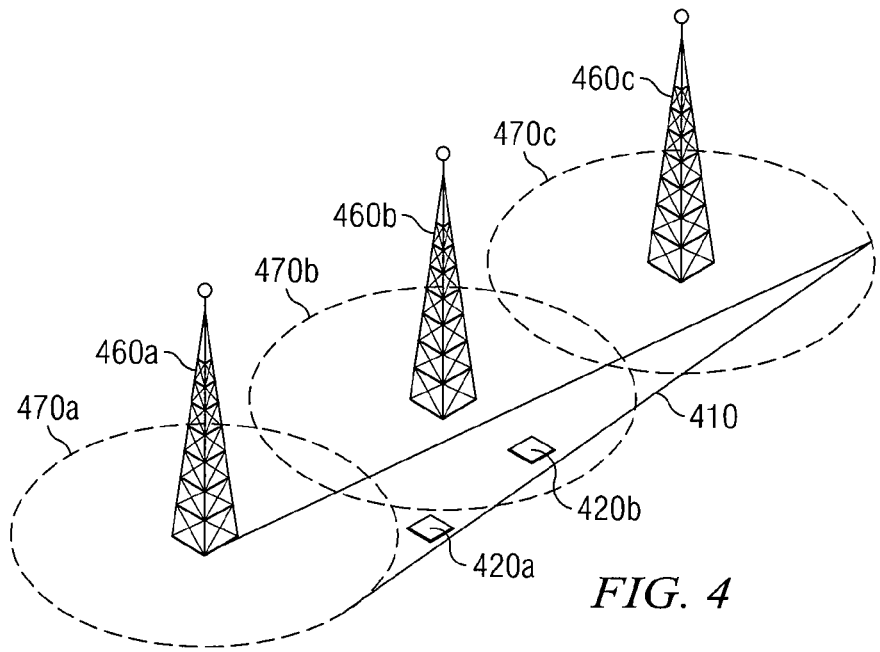
FIG. 4 is a diagram illustrating a mobile unit traveling between two base stations, in accordance with a particular embodiment.

FIG. 4 is a diagram illustrating a mobile unit traveling between two base stations, in accordance with a particular embodiment. The following example is presented in order to illustrate location based handoffs in the context of a particular example. For purposes of this example, assume that a user is within car 420 talking on a cell phone that has a built-in GPS receiver. For convenience, car 420, the cell phone and the user may collectively be referred to as car 420. Further assume that car 420 is traveling north (from base station 460a towards base station 460c) along road 410 and that the illustrated blocks 420a and 420b show the location of car 420 at two different times (e.g., block 420b is car 420 at a later time than block 420a).

Initially, as car 420 drives north it is within area 470a, the area serviced by base station 460a. Accordingly, there may be a wireless connection between car 420 and base station 460a. As car 420 drives along road 410, the user's cell phone may periodically transmit its location. This location information may be received by base station 460a and relayed to a system manager (e.g., system manager 130). Thus, the system manager may be aware of the location of car 420 and may be able to predict its location as it drives along road 410. As car 420 approaches the border of area 470a, as shown by car 420a, the system manager may determine that the wireless connection with car 420 should be handed-off to base station 460b so that when car 420 is within area 470b, as shown by car 420b, the wireless connection is between car 420 and base station 460b.

The mechanics of the actual handoff of the wireless connection may be in accordance with any of a variety of standard and non-standard handoffs, including hard handoffs ("break before make") and soft handoffs ("make before break"). The handoff may be sufficiently quick so that in most instances the user is not even aware that the handoff has occurred.

Regardless of how the handoff occurs, the trigger for the handoff may be the location of car 420 (e.g. car 420a). The system manager may also be able to determine that since car 420 is traveling along road 410, it may eventually enter area 470c. Accordingly, the system manager may reserve resources (e.g., a channel and/or bandwidth) for a wireless connection between base station 460c and car 420. This may be done in anticipation of an impending handoff from base station to 460b. The anticipation of the handoff based on the location of car 420 and the fact that car 420 is on road 410 and heading north towards base station 460c, may help the system manager facilitate a smooth handoff and ensure that adequate resources may be available upon car 420 reaching area 470c. In particular embodiments, the system manager may be able to predict the next handoff even if it is not aware of the fact that car 420 is on road 410 (or that road 410 even exists). More specifically, the system manager may be able to simply use the direction and/or speed of car 420 to determine the next handoff.

In particular embodiments, the system manager may decide to initiate a handoff based on the predicted location of car 420 as well as the congestion/capacity of base stations 460. For example, if the number of wireless connections being maintained by base station 460a is above a certain threshold, the system manager may decide to handoff car 420 to base station 460b before it reaches location 420a. In other words, to help relieve the congestion within area 470a the system manager may facilitate the handoff of car 420 to the adjacent base station 460b sooner than it would under normal circumstances.

In some embodiments, the system manager may be able to combine both congestion management and predictive handoff. For example, if base station 460c is at, or near, its limit, the system manager may begin to facilitate handing-off other wireless connections to adjacent base stations prior to facilitating the handing-off of car 420 to base station 460c. Additionally, the system manager may wait to facilitate the handoff of car 420 to base station 460c until car 420's location is further within area 470c.

While in this embodiment the determination of when and where to handoff car 420 was made by a system manager, in particular embodiments car 420 and/or one or more of base stations 460 may make the determination. For example, in some embodiments, instead of the user's cell phone transmitting its location, base stations 460 may transmit information from which the user's cell phone may be able to determine the area covered by areas 470. Then using the information on areas 470 and its own known location and predicted location, the user's cell phone may make the determination of when (e.g. at what location) it should be handed-off to the next base station 460.

In certain scenarios it may be that as mobile unit 420 leaves the coverage area of a first base station, for example base station 460a, there are two possible base stations to which mobile unit 420 may be handed-off. Accordingly, particular embodiments may factor in a combination of one or more of the following factors in determining which base station to select: route and destination information of mobile unit 120, route and destination information of other mobile units, the travel segment between the current location of mobile unit 120 and its destination, current congestion levels of potential base stations, and predicted congestion levels of potential base stations.

Figure 5:
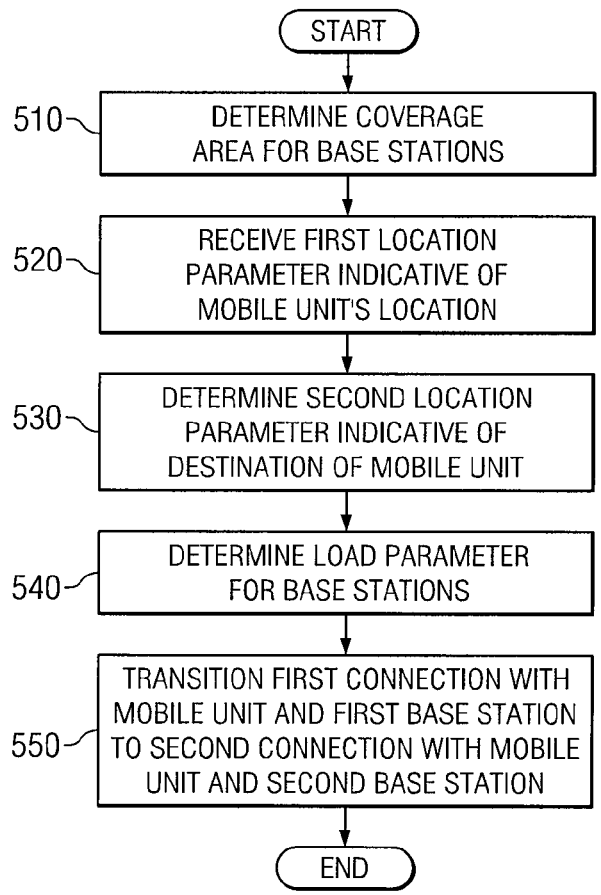
FIG. 5 illustrates a method for providing location based handoffs, in accordance with a particular embodiment.

FIG. 5 illustrates a method for providing location based handoffs, in accordance with a particular embodiment. The steps depicted in FIG. 5 are from the perspective of a system manager (e.g., system manager 130). The method begins at step 510 with a determination of a coverage area for each base station being serviced by the system manager. The determination may be made once (e.g., during initial setup), intermittently, (e.g., whenever a base station is added or removed) or periodically (e.g., once a week). In some embodiments the determination of coverage area may involve each base station testing its coverage area (e.g., through the use of testing signals). In particular embodiments the coverage areas may be pre-determined by a user (e.g., a user responsible for configuring/maintaining the base stations serviced by the system manager).

At step 520 the system manager receives a first location parameter indicative of the predicted location of a mobile unit (e.g., mobile unit 120). The first location parameter may be based on GPS or wireless networking location information. The information may initially be received by a base station and passed to the system manager. For example, if the mobile unit currently is connected to a first base station, the first base station may periodically receive the mobile unit's location and relay that information to the system manager.

At step 530 the system manager receives a second location parameter indicative of the destination of the mobile unit. The destination may be a final destination, or it may be an intermediary destination. For example, if the mobile unit is traveling from a first city to a second city, the final destination may be the second city while an intermediary destination may be a particular road used to get to the second city. In some embodiments the system manager may explicitly receive the mobile unit's destination. For example, the mobile unit may include a route guidance unit that is providing the user with directions to the second city. Using this route guidance information the mobile unit may be able to transmit its final destination and any intermediary destinations that may be desired. In particular embodiments the system manager may implicitly receive the mobile unit's destination. For example, if the system manager determines that the user has entered a freeway heading in a particular direction then it may determine that the mobile unit's destination is some point along that freeway in the direction the mobile unit is traveling.

At step 540 the system manager determines the load parameters of the base stations. This may include such parameters as the number of connections being maintained by a base station, the amount of traffic passing through a base station, the number of communications passing through a base station, the amount of data passing through a base station, or a combination of one or more of the above identified factors, or any other desired factors.

At step 550 the system manager facilitates the transition of the first connection between the mobile unit and the first base station to a second connection between the mobile unit and a second base station. When the transition occurs and to which base station the mobile unit is handed-off may depend on coverage area of the base stations, the location of the mobile unit, the mobile unit's destination and the load parameters of the base stations. The importance/weight of these factors may vary depending on the situation and operational policy embedded within the system manager. For example, it may be that as the difference in the amount of traffic handled by the first base station and second base station increases, the more important the load parameter becomes. That is, if both base stations are experiencing a heavy traffic load then the system manager may not place as high of an importance on the load parameter because switching a connection from one congested base station to another does not improve the overall congestion of the system. As another example, the system manager may be more willing to transition the mobile unit from the first connection to the second connection based on the mobile unit's location if it knows the mobile unit's destination. In other words, if the system manager knows where the mobile unit is headed then it may be more willing to connect the mobile unit to the next base station because it knows it will be making the hand-off anyway.

While the steps depicted in FIG. 5, and described above, are depicted and described from the perspective of a system manager, any of the components of communication network 100 may perform the same or similar steps. For example, in some embodiments the mobile unit may request coverage area information and load parameters from/regarding nearby base stations, determine its location from an integrated GPS device and its destination from user input. Then using this information the mobile unit may determine when to request a handoff from the first base station to the second base station.

Some of the steps illustrated in FIG. 5 may be combined, modified or deleted where appropriate, and additional steps may also be added to the flowchart. Additionally, the steps may be performed in any suitable order without departing from the scope of particular embodiments.

Although particular embodiments have been described in detail with reference to particular embodiments, it should be understood that various other changes, substitutions, and alterations may be made hereto without departing from the spirit and scope of the present disclosure. For example, although particular embodiments have been described with reference to a number of elements included within communication network 100, system manager 200, and mobile unit 300, these elements may be combined, rearranged or positioned in order to accommodate particular handoff needs. In addition, any of these elements may be provided as separate external components to communication network 100, system manager 200 and/or mobile unit 300, where appropriate. The present disclosure contemplates great flexibility in the arrangement of these elements as well as their internal components.

Numerous other changes, substitutions, variations, alterations and modifications may be ascertained by those skilled in the art and it is intended that various embodiments may encompass all, some or none of these changes, substitutions, variations, alterations and modifications. It is further intended that these changes, substitutions, variation, alteration and modifications fall within the spirit and scope of the appended claims.

What is claimed is:

1. A method comprising:
   determining a coverage area for each of a plurality of base stations;
   receiving a first location parameter indicative of a mobile unit's predicted location;
   receiving a second location parameter indicative of a destination of the mobile unit;
   determining a route associated with the mobile unit based on the first and second location parameters;
   determining to transition a first connection between the mobile unit and a first base station of the plurality of base stations to a second connection between the mobile unit and a second base station of the plurality of base stations based on the coverage areas of the first base station and the second base station and the determined route;
   requesting a reservation of at least one connection resource at the second base station prior to the transition; and
   facilitating a transition of the first connection between the mobile unit and the first base station of the plurality of base stations to the second connection between the mobile unit and the second base station of the plurality of base stations based on the coverage areas of the first base station and the second base station and the first location parameter.

2. The method of claim 1:
   further comprising determining a second location parameter indicative of a destination of the mobile unit; and
   wherein facilitating the transition of the first connection to the second connection based on the coverage areas of the first base station and the second base station and the first location parameter comprises facilitating the transition of the first connection to the second connection based on the coverage areas of the first base station and the second base station, the first location parameter and the second location parameter.

3. The method of claim 1, wherein facilitating the transition of the first connection to the second connection based on the coverage areas of the first base station and the second base station and the first location parameter comprises facilitating the transition of the first connection to the second connection based on the coverage areas of the first base station and the second base station, the first location parameter and at least one optimization parameter.

4. The method of claim 3, wherein the at least one optimization parameter is selected from a group consisting of at least one optimization parameter for optimizing a user experience, at least one optimization parameter for optimizing a capacity parameter of at least one base station of the plurality of base stations, and at least one optimization parameter for optimizing a load parameter of at least one base station of the plurality of base stations.

5. The method of claim 1:
   further comprising determining a load parameter for at least one base station of the plurality of base stations; and
   wherein facilitating the transition of the first connection to the second connection based on the coverage areas of the first base station and the second base station and the first location parameter comprises facilitating the transition of the first connection to the second connection based on the coverage areas of the first base station and the second base station, the first location parameter, and the load parameter.

6. A method comprising:
   establishing a first connection with a first base station of a plurality of base stations;
   determining a coverage area for at least the first base station and a second base station;
   determining a first location parameter indicative of a mobile unit's predicted location;
   determining a second location parameter indicative of a destination of the mobile unit;
   determining a route associated with the mobile unit based on the first and second location parameters;
   determining to handoff the first connection to a second connection with a second base station of the plurality of base stations based on the coverage areas of the first base station and the second base station and the determined route;
   requesting a reservation of at least one connection resource at the second base station prior to the handoff; and
   requesting a handoff from the first base station to the second base station of the plurality of base stations based on the coverage areas for the first base station and the second base station, the route associated with the mobile unit and the first location parameter.

7. The method of claim 6, further comprising:
   determining a coverage area for at least a third base station of the plurality of base stations; and
   requesting a reservation of at least one connection resource from the third base station based on the determined route and the coverage area of the third base station.

8. The method of claim 6, wherein determining the first location parameter comprises determining the first location parameter using a global positioning system.

9. The method of claim 6, wherein determining the first location parameter comprises determining the first location parameter using wireless-networking location information.

10. The method of claim 6, wherein requesting a handoff from the first base station to a second base station of the plurality of base stations based on the coverage areas for the first base station and the second base station and the first location parameter comprises requesting a handoff from the first base station to the second base station based on the coverage areas for the first base station and the second base station, the first location parameter and at least one optimization parameter.

11. The method of claim 10, wherein the at least one optimization parameter is selected from a group consisting of at least one optimization parameter for optimizing a user experience and at least one optimization parameter for optimizing a user cost parameter.

12. The method of claim 6,
   further comprising:
      determining the coverage area for at least a third base station; and
      determining a second location parameter indicative of a destination; and
   wherein requesting a handoff from the first base station to a second base station of the plurality of base stations comprises requesting a handoff from the first base station to a second base station of the plurality of base stations based on the coverage areas for the first base station, the second base station, and the third base station, and the first and second location parameters.

13. An apparatus comprising:
a processor operable to determine a coverage area for each of a plurality of base stations; and
an interface coupled to the processor and operable to:
receive a first location parameter indicative of a mobile unit's predicted location;
receive a second location parameter indicative of a destination of the mobile unit;
determine a route associated with the mobile unit based on the first and second location parameters;
determine to transition a first connection between the mobile unit and a first base station of the plurality of base stations to a second connection between the mobile unit and a second base station of the plurality of base stations based on the coverage areas of the first base station and the second base station and the determined route;
request a reservation of at least one connection resource at the second base station prior to the transition; and
facilitate a transition of the first connection between the mobile unit and the first base station of the plurality of base stations to the second connection between the mobile unit and the second base station of the plurality of base stations based on the coverage areas of the first base station and the second base station and the first location parameter.

14. The apparatus of claim 13:
wherein the processor operable to facilitate the transition of the first connection to the second connection based on the coverage areas of the first base station and the second base station and the first location parameter comprises a processor operable to facilitate the transition of the first connection to the second connection based on the coverage areas of the first base station and the second base station, the first location parameter and the second location parameter.

15. The apparatus of claim 13, wherein the processor operable to facilitate the transition of the first connection to the second connection based on the coverage areas of the first base station and the second base station and the first location parameter comprises a processor operable to facilitate the transition of the first connection to the second connection based on the coverage areas of the first base station and the second base station, the first location parameter and at least one optimization parameter.

16. The apparatus of claim 15, wherein the at least one optimization parameter is selected from a group consisting of at least one optimization parameter for optimizing a user experience, at least one optimization parameter for optimizing a capacity parameter of at least one base station of the plurality of base stations, and at least one optimization parameter for optimizing a load parameter of at least one base station of the plurality of base stations.

17. The apparatus of claim 13:
wherein the processor is further operable to determine a load parameter for at least one base station of the plurality of base stations; and
wherein the processor operable to facilitate the transition of the first connection to the second connection based on the coverage areas of the first base station and the second base station and the first location parameter comprises a processor operable to facilitate the transition of the first connection to the second connection based on the coverage areas of the first base station and the second base station, the first location parameter, and the load parameter.

18. An apparatus comprising:
an interface operable to establish a first connection with a first base station of a plurality of base stations; and
a processor coupled to the interface and operable to:
determine a coverage area for at least the first base station and a second base station;
determine a first location parameter indicative of a mobile unit's predicted location;
determine a second location parameter indicative of a destination of the mobile unit;
determine a route associated with a mobile unit based on the first and second location parameters;
determine to handoff the first connection to a second connection with a second base station of the plurality of base stations based on the coverage areas of the first base station and the second base station and the determined route;
request a reservation of at least one connection resource at the second base station prior to the handoff; and
request a handoff from the first base station to the second base station of the plurality of base stations based on the coverage areas for the first base station and the second base station, the route associated with the mobile unit, and the first location parameter.

19. The apparatus of claim 18, wherein the processor is further operable to:
determine a coverage area for at least a third base station of the plurality of base stations; and
request a reservation of at least one connection resource from the third base station based on the determined route and the coverage area of the third base station.

20. The apparatus of claim 18, wherein the processor operable to determine the first location parameter comprises a processor operable to determine the first location parameter using a global positioning system.

21. The apparatus of claim 18, wherein the processor operable to determine the first location parameter comprises a processor operable to determine the first location parameter using wireless-networking location information.

22. The apparatus of claim 18, wherein the processor operable to request a handoff from the first base station to a second base station of the plurality of base stations based on the coverage areas for the first base station and the second base station and the first location parameter comprises a processor operable to request a handoff from the first base station to the second base station based on the coverage areas for the first base station and the second base station, the first location parameter and at least one optimization parameter.

23. The apparatus of claim 22, wherein the at least one optimization parameter is selected from a group consisting of at least one optimization parameter for optimizing a user experience and at least one optimization parameter for optimizing a user cost parameter.

24. The apparatus of claim 18:
wherein the processor is further operable to:
determine the coverage area for at least a third base station; and
determine a second location parameter indicative of a destination; and
wherein the processor operable to request a handoff from the first base station to a second base station of the plurality of base stations comprises a processor operable to request a handoff from the first base station to a second base station of the plurality of base stations based on the coverage areas for the first base station, the second base station, and the third base station, and the first and second location parameters.

25. The method of claim 1, wherein the transition of the first connection between the mobile unit and the first base station of the plurality of base stations to the second connection between the mobile unit and the second base station of the plurality of base stations based on the coverage areas of the first base station and the second base station and the first location parameter is facilitated without determining a signal strength of a signal transmitted by the second base station.

26. The method of claim 7, wherein the coverage area for the third base station of the plurality of base stations does not overlap with the coverage area for the first base station.

27. The method of claim 1, further comprising:
requesting a reservation of at least one connection resource from a third base station of the plurality of base stations based on the determined route and the coverage area of the third base station, wherein the coverage area for the third base station of the plurality of base stations does not overlap with the coverage area for the first base station.

* * * * *